G. HINAMAN.
DEVICES FOR EXTRACTING JUICES.
No. 183,167. Patented Oct. 10, 1876.
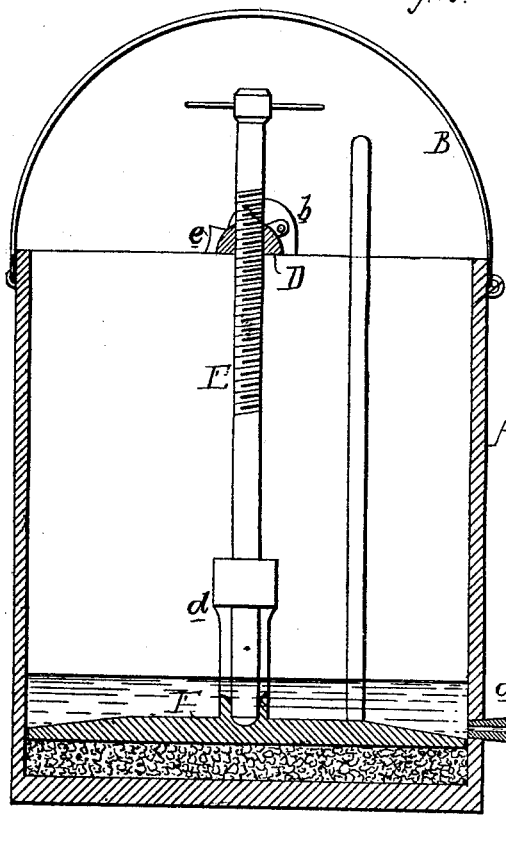
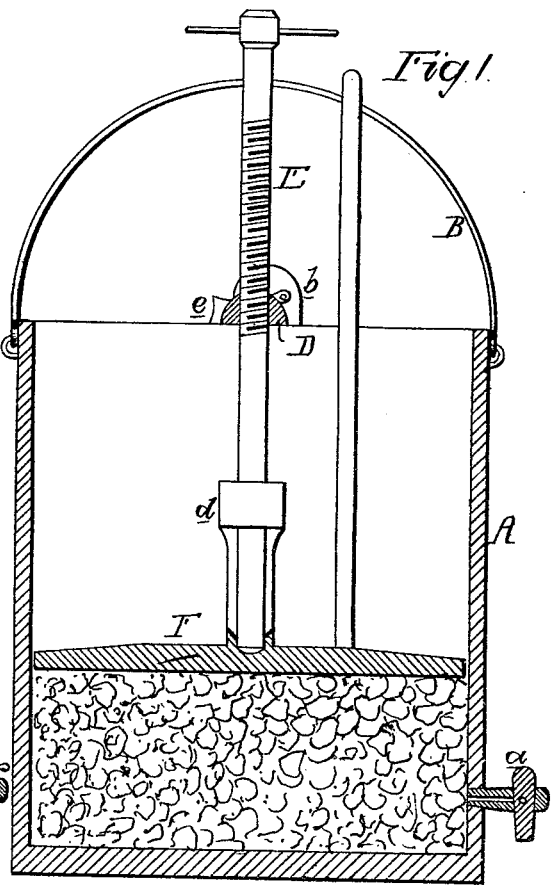
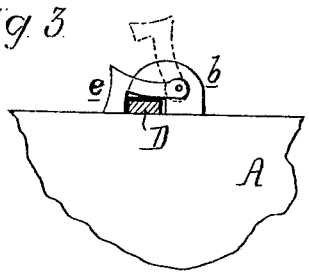
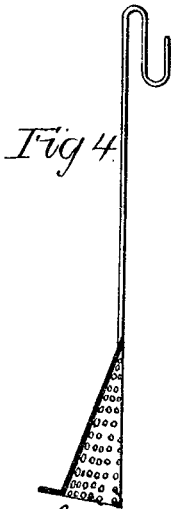
Witnesses
Harry Smith
Harry Howson Jr
Gustave Hinaman
by his Attorneys
Howson and Son
JAMES R. OSGOOD & CO. BOSTON

UNITED STATES PATENT OFFICE.

GUSTAVE HINAMAN, OF LONG EDDY, NEW YORK.

IMPROVEMENT IN DEVICES FOR EXTRACTING JUICES.

Specification forming part of Letters Patent No. 183,167, dated October 10, 1876; application filed July 19, 1876.

*To all whom it may concern:*

Be it known that I, GUSTAVE HINAMAN, of Long Eddy, Sullivan county, New York, have invented an Improved Device for Extracting Juices, &c., of which the following is a specification:

The object of my invention is to construct a cheap and simple device for extracting lard, wax, juices, &c., and this object I attain in the manner which I will now proceed to describe, reference being had to the accompanying drawing, in which—

Figure 1 is a vertical section of my improved extracting device; Fig. 2, the same, with the parts in a different position, and Figs. 3 and 4 detached views.

A is a plain cylindrical vessel, having at the top the usual bail B, by which it is carried about, and at one side and some distance above the bottom a spigot, a. On the upper edge of the vessel, at opposite sides, are formed ears b b, to recesses, in which are adapted the ends of a bar, D, which extends across the top of the vessel, and has in the center a threaded opening, to which is adapted a screw-stem, E, provided at the top with a suitable handle, and guided at the bottom in a sleeve, d, on a plunger, F, upon which the lower end of the stem E bears. The ends of the bar D are held in the recesses of the ears b b by means of hooked arms e, hung to the ears, and bearing upon the outer edges of the bar.

The plunger F is of such a diameter that there is a slight space between its circumference and the inner surface of the vessel A.

In order to extract the liquid matter from any substance a certain quantity of the latter is first put into the vessel A, the plunger F laid on the top of the same, the cross-bar D applied and secured, and the spigot a closed. Upon operating the screw-stem E the plunger is forced down on the mass, and the liquid, as it is extracted, passes up around the edge of the plunger, and remains above the same. When the plunger has been depressed to such an extent that its upper edge is even with or below the opening of the spigot a the latter is opened, and the extracted liquid allowed to flow from the same into any suitable receptacle. When all the extracted matter has been removed the spigot is closed, the bar D removed, the plunger F withdrawn, and the vessel emptied prior to receiving a fresh supply.

By the above means I am enabled to dispense with strainers, against which a pressure is exerted, and which are apt to become clogged and dirty, the only strainer which is ever necessary to be used in connection with my device being one of the character shown in Fig. 4, which covers the entrance to the spigot, and rests upon the top of the plunger after the latter has been depressed, as shown in Fig. 2. As there is no pressure against the strainer, however, there is no tendency for it to become choked or clogged up.

As the vessel A is made of metal, and is adapted to be set upon a stove or furnace, the device is especially applicable to operating upon materials or substances in which heat is required to insure the thorough working of the extracting process, a saving of labor being effected in this case, owing to the fact that both the heating and extracting operations are carried on in the same vessel, thus dispensing with the disagreeable necessity of handling the heated substances.

When the bar D and plunger F are removed the vessel A may be used as an ordinary cooking utensil, the spigot a in this case affording a convenient means of drawing off the contents of the vessel without removing the latter from the stove.

I claim as my invention—

The combination of the vessel A and its spigot a, arranged above the bottom, with the loosely-fitting plunger F, as set forth.

In testimony whereof I have signed my name to this specification in the presence of two subscribing witnesses.

GUSTAVE HINAMAN.

Witnesses:
 H. H. McKOON,
 C. JUNG.